(12) United States Patent
Choi et al.

(10) Patent No.: US 10,407,099 B2
(45) Date of Patent: Sep. 10, 2019

(54) FRONT VEHICLE BODY REINFORCING STRUCTURE

(71) Applicants: Hyundai Motor Company, Seoul (KR); Kia Motors Corporation, Seoul (KR)

(72) Inventors: Seongeun Choi, Gyoenggi-do (KR); SeungMin Jeong, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 23 days.

(21) Appl. No.: 15/810,878

(22) Filed: Nov. 13, 2017

(65) Prior Publication Data

US 2019/0106152 A1    Apr. 11, 2019

(30) Foreign Application Priority Data

Oct. 11, 2017    (KR) .................... 10-2017-0131549

(51) Int. Cl.
*B62D 21/15*    (2006.01)
*B62D 25/08*    (2006.01)
(Continued)

(52) U.S. Cl.
CPC ........... *B62D 21/152* (2013.01); *B62D 21/15* (2013.01); *B62D 25/082* (2013.01);
(Continued)

(58) Field of Classification Search
CPC .... B62D 21/152; B62D 25/08; B62D 25/081; B62D 25/082; B62D 25/088; B62D 29/007; B62D 29/008
(Continued)

(56) References Cited

U.S. PATENT DOCUMENTS 7,703,805 B2 *  4/2010  Sasaki ................ B62D 21/152
                                                280/784
7,845,716 B2 * 12/2010  Kiyotake ........... B62D 21/152
                                                296/203.02
(Continued)

FOREIGN PATENT DOCUMENTS

JP    2014-118009 A    6/2014
KR    2014-0087256 A   7/2014

*Primary Examiner* — Jason S Daniels
(74) *Attorney, Agent, or Firm* — Mintz Levin Cohn Ferris Glovsky and Popeo, P.C.; Peter F. Corless

(57) ABSTRACT

A front vehicle body reinforcing structure is provided. The structure includes a front side member that extends in the length direction and is disposed at both left and right sides in the width direction and a wheel housing panel that houses a wheel, disposed external to the front side member in the width direction and coupled with the front side member. A dash panel extends in the width and height directions, and compartmentalizing an engine and occupant compartment. A front pillar extends in the length and height directions and is coupled with the wheel housing panel and the dash panel. Additionally, a cowl cross member extends in the width direction and includes both end portions coupled to the front pillar and the wheel housing panel. A first reinforcing member extends in the length and height directions and is coupled to the wheel housing panel and the front pillar vehicle.

12 Claims, 8 Drawing Sheets

(51) Int. Cl.
*B62D 25/14* (2006.01)
*B62D 29/00* (2006.01)

(52) U.S. Cl.
CPC ........... *B62D 25/088* (2013.01); *B62D 25/14* (2013.01); *B62D 29/007* (2013.01); *B62D 29/008* (2013.01)

(58) Field of Classification Search
USPC ................. 296/192, 193.08, 198, 203.02
See application file for complete search history.

(56) References Cited

U.S. PATENT DOCUMENTS

| | | | | |
|---|---|---|---|---|
| 8,070,215 | B2 * | 12/2011 | Yoshioka | B62D 25/025 296/187.12 |
| 8,240,747 | B2 * | 8/2012 | Kim | B62D 25/081 296/192 |
| 8,899,662 | B2 * | 12/2014 | Kido | B62D 25/088 296/187.09 |
| 10,053,152 | B2 * | 8/2018 | Kellner | B62D 21/15 |
| 10,071,769 | B2 * | 9/2018 | Kim | B62D 21/152 |
| 2018/0370576 | A1 * | 12/2018 | Shibata | B62D 25/081 |

* cited by examiner

FRONT VEHICLE BODY REINFORCING STRUCTURE

CROSS-REFERENCE TO RELATED APPLICATION

This application claims priority to and the benefit of Korean Patent Application No. 10-2017-0131549 filed on Oct. 11, 2017, the entire contents of which are incorporated herein by reference.

BACKGROUND

(a) Field of the Disclosure

The present disclosure relates to a front vehicle body reinforcing structure, and more particularly, to a front vehicle body reinforcing structure that improves the reaction performance during a front overlap collision of a vehicle.

(b) Description of the Related Art

Generally, a front vehicle body is disposed at a front portion based on the longitudinal direction of the vehicle and includes a frame structure that forms an engine compartment. The front vehicle body includes a front end module which forms a front end of the engine compartment and a cooling module, a head lamp, etc., are installed therein. A front fender apron member forms both the left and right sides of the engine compartment and provides a space where a suspension system is disposed and wheels are installed. A dash panel is disposed behind the engine compartment and partitions a passenger compartment from the engine compartment.

Additionally, a front end member extending in a longitudinal direction of a vehicle is disposed under the engine compartment in left and right directions in a widthwise direction of a vehicle to provide reinforcement to the structural strength of the front vehicle body. A sub-frame for supporting an engine and a transmission are installed in the engine compartment and a suspension system is disposed at the lower portion of the front end member in the height direction of the vehicle. The front end portion of the front side member is mounted on a bumper beam extended in the width direction of a vehicle to improve the front collision performance. The bumper beam is connected with the front end portion in the length direction of the vehicle through a crash box.

In particular, when a vehicle having a front vehicle body with the above structure collides head-on with small overlap with an collision object such as an obstacle or another vehicle during operation, (e.g., when a collision object such as a small overlap barrier deviated to one side along the width direction of the vehicle and collides with the outside portion of the vehicle body) the collision object displaces the front side member to collide with the weak outer portion of the vehicle body. Accordingly, the vehicle does not effectively perform during a front small-overlap collision and the passenger safety is compromised and excessive collision damage of the vehicle body occurs.

In order to solve the above-described deficiencies, reinforcing the outer portion of a vehicle body to cope with a small overlap collision has been proposed. For example, a structure having a front end portion of a front fender apron member was extended to a front end portion of a front side member and connected to each other by a connecting member, a structure having a reinforcement member for preventing infiltration of an collision object was mounted on the outside of a front side member, or a structure for reinforcing a front pillar or a side sill have been proposed. However, the proposed structures have the drawbacks that include excessive increase in the weight and cost of the vehicle body and insufficient protection of the passenger during the small overlap collision.

The above information disclosed in this section is merely for enhancement of understanding of the background of the disclosure and therefore it may contain information that does not form the prior art that is already known in this country to a person of ordinary skill in the art.

SUMMARY

The present disclosure provides a front vehicle body reinforcing structure capable of preventing the vehicle from being excessively damaged by suppressing the rotational behavior, inducing the transverse direction behavior of the vehicle during a frontal small overlap collision of the vehicle and more effectively protects the safety of the passenger.

A front vehicle body reinforcing structure according to an exemplary embodiment of the present disclosure may include a front side member formed to extend in the length direction of a vehicle and disposed at both left and right sides along the width direction of the vehicle, a wheel housing panel in which a wheel of the vehicle is housed, disposed on the exterior of the front side member along the width direction of the vehicle and coupled with the front side member, a dash panel formed to extend in the width direction and height direction of the vehicle, and compartmentalizing an engine compartment and an occupant compartment, a front pillar formed to extend in the length direction and the height direction of the vehicle and coupled with the wheel housing panel and the dash panel, a cowl cross member formed to extend in the width direction of the vehicle and including both end portions coupled to the front pillar and the wheel housing panel, respectively and a first reinforcing member formed to extend in the length direction and the height direction of the vehicle and coupled to the wheel housing panel and the front pillar.

In some exemplary embodiments, the cowl cross member may be coupled to an upper surface of the wheel housing panel in the height direction of the vehicle and the front pillar, and the first reinforcing member may be coupled to a lower surface of the wheel housing panel in the height direction of the vehicle and the front pillar. Accordingly, a closed cross section may be formed by the cowl cross member, the first reinforcing member and the front pillar. The first reinforcing member may be disposed to form an obtuse angle with respect to the front side member.

In other exemplary embodiments, a side sill member may be disposed at left and right sides according to the width direction of the vehicle and a side sill front member may be coupled to a front end portion of the side sill member in the length direction of the vehicle, and a lower end portion of the front pillar may be coupled to the side sill front member. Additionally, a second reinforcing member may include a first end portion connected with the front side member and a second end portion connected with the side sill front member.

In an exemplary embodiment, a third reinforcing member may be coupled to the front end portion of the side sill front member along the length direction of the vehicle. The side sill front member may be coupled to the lower portion of the front pillar and the third reinforcing member may be coupled to the portion where the side sill front member and the front pillar 40 are coupled to each other. In particular, the third reinforcing member may have a box-shaped cross section.

Additionally, in some exemplary embodiments, a fourth reinforcing member may be inserted into and coupled to the side sill front member and the side sill member. The fourth reinforcing member may be formed to have a box-shaped cross-section as a steel or aluminum extruded material. In particular, a front end portion of the fourth reinforcing member along the length direction of the vehicle may be formed with a slanted reward surface in the length direction of the vehicle.

In other exemplary embodiments, a fifth reinforcing member may be connected the front side member and the cowl cross member. The fifth reinforcing member may be connected with the first reinforcing member.

In accordance with the front vehicle body reinforcing structure according to an exemplary embodiment of the present disclosure, when the vehicle collides with the collision object such as a barrier while being driven with a small overlap at the outer portion of vehicle body, (e.g., when the vehicle collides with the collision object off the front side member), the vehicle may be displaced in the lateral direction by the first to fifth reinforcing members. The collision load input to the vehicle body may be appropriately dispersed and the tires are led away from the vehicle body to prevent excessive damage of the vehicle body. Accordingly, the incidence of the collision injury of the passenger may be reduced.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other exemplary embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed there between.

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Figure 1:
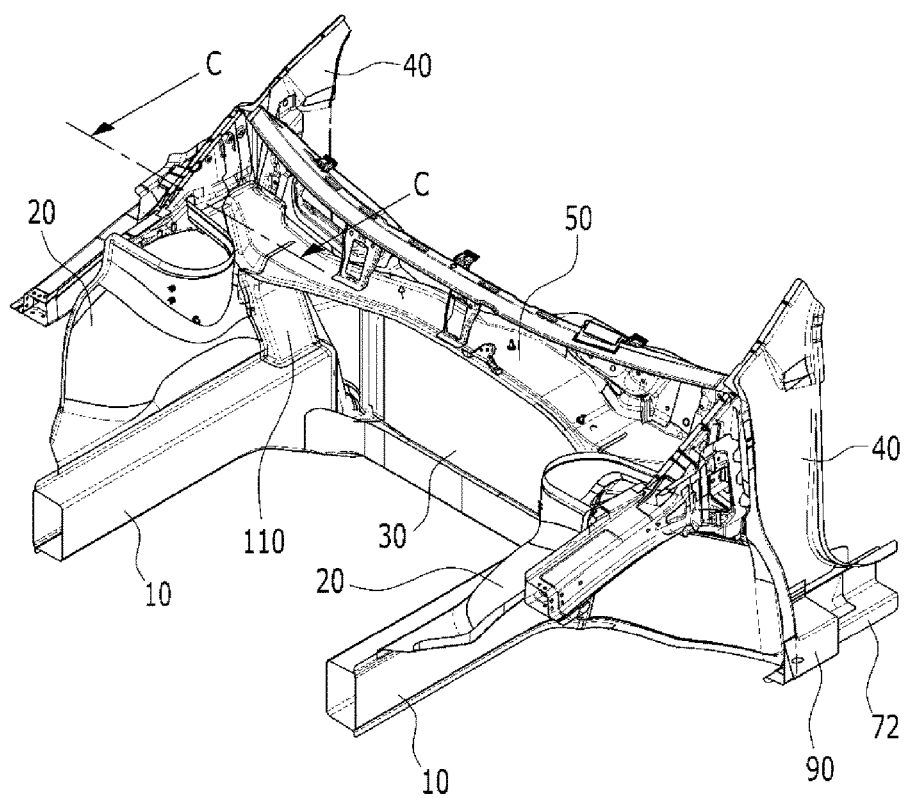
FIG. 1 is an exemplary perspective view of a front vehicle body reinforcing structure according to an exemplary embodiment of the present disclosure.
Figure 2:
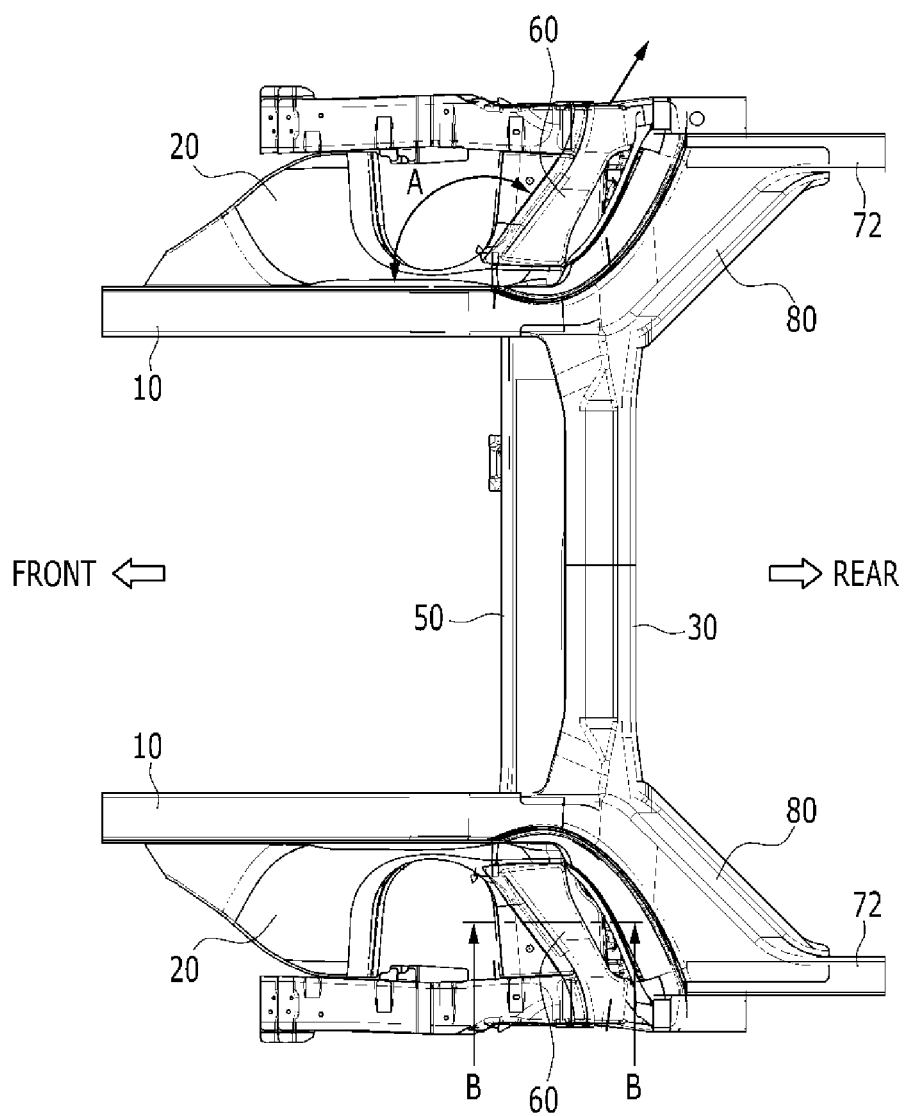
FIG. 2 is an exemplary top plan view of the lower portion of the front vehicle body reinforcing structure according to an exemplary embodiment of the present disclosure.
Figure 3:
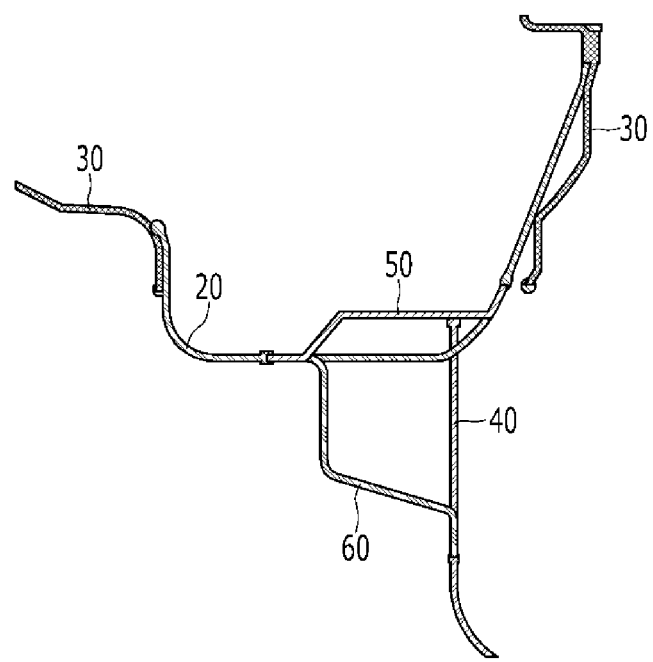
FIG. 3 is an exemplary B-B line cross-sectional view of FIG. 2 according to an exemplary embodiment of the present disclosure.

An exemplary embodiment of the present disclosure will now be described in detail with reference to the accompanying drawing. Referring to FIG. 1 to FIG. 3, a front vehicle body applied to a reinforcing structure according to an exemplary embodiment of the present disclosure may include a front side member 10 formed to extend in the length direction of a vehicle and disposed at both left and right sides along the width direction of the vehicle, a wheel housing panel 20 in which a wheel of the vehicle is housed, disposed external to the front side member 10 in the width direction of the vehicle and coupled with the front side member 10, and a dash panel 30 formed to extend in the width direction and height direction of the vehicle, and compartmentalizing an engine compartment and an occupant compartment.

A front pillar 40 formed to extend in the length direction and the height direction of the vehicle may be coupled to the wheel housing panel 20 and the dash panel 30, and both end portions of a cowl cross member 50 formed to extend in the width direction of the vehicle may be boned to the front pillar 40 and the wheel housing panel 20. In the exemplary embodiment of the present disclosure for reinforcing the front vehicle body structure, a first reinforcing member 60 formed to extend in the length direction of the vehicle and the height direction may further be provided.

The first reinforcing member 60 may be coupled to the wheel housing panel 20 and the front pillar 40 as shown in the cross sectional view in FIG. 3 and may form a closed cross section with the cowl cross member 50. In other words, the cowl cross member 50 may be coupled to an upper surface of the wheel housing panel 20 in the height direction of the vehicle and the front pillar 40. The first reinforcing member 60 may be coupled to a lower surface of wheel housing panel 20 in the height direction of the vehicle and the front pillar 40. Accordingly, the closed cross section may be formed by the cowl cross member 50, the first reinforcing member 60 and the front pillar 40. The coupling stiffness between the wheel housing panel 20, the front pillar 40 and the cowl cross member 50 may be increased by the first reinforcing member to improve the performance for coping with the front small overlap.

As shown in FIG. 2, the first reinforcing member 60 may be disposed to form an obtuse angle A with respect to the front side member 10. When the collision object collides with the first reinforcing member 60 with a forward small overlap, the vehicle body exhibits slip behavior in the transverse direction due to the obtuse disposition of the first reinforcing member 60 and may prevent excessive damage to the vehicle body due to collision with the collision object and may reduce the passenger's injury risk.

Figure 5:
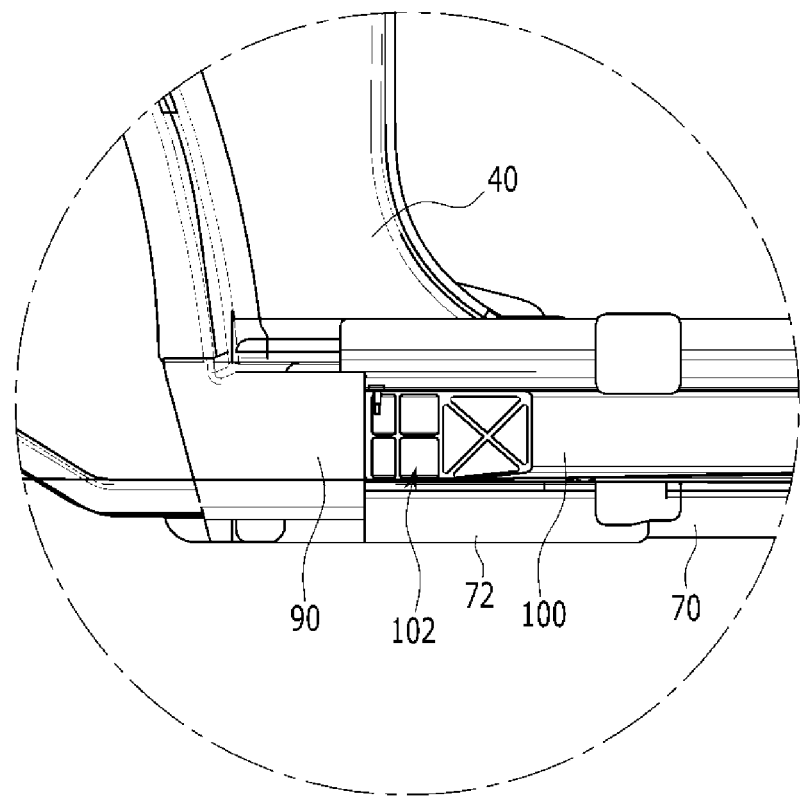
FIG. 5 is an exemplary front view of the lower portion of the front vehicle body reinforcing structure according to an exemplary embodiment of the present disclosure.
Figure 6:
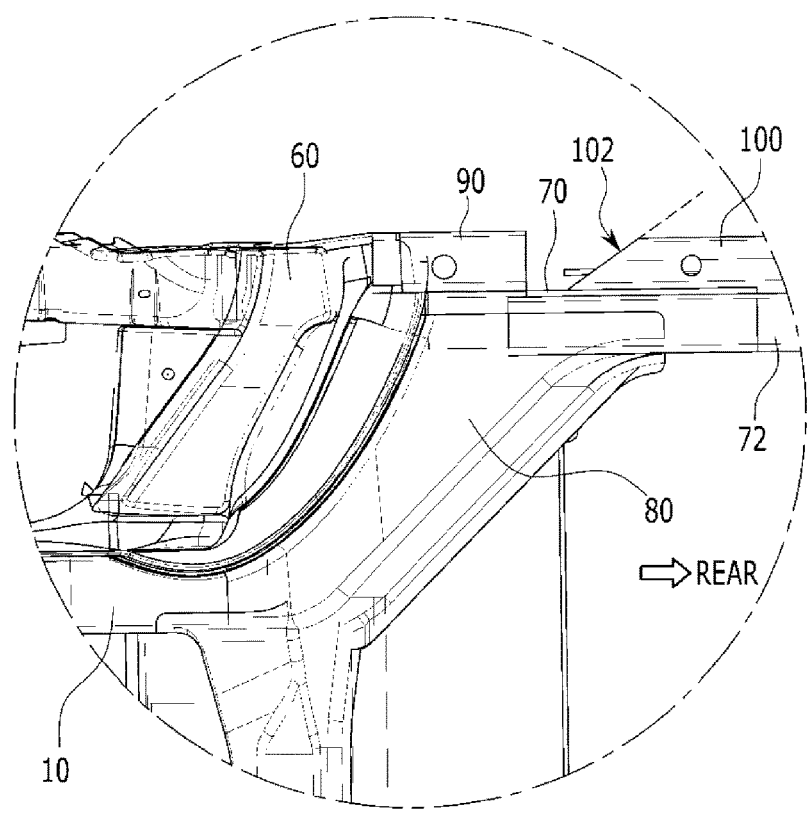
FIG. 6 is an exemplary perspective view of the main part of the front vehicle body reinforcing structure according to an exemplary embodiment of the present disclosure.

Referring to FIG. 5 and FIG. 6, the front vehicle body applied to the reinforcing structure according to an exemplary embodiment of the present disclosure may include a side sill member 70 formed to extend in the length direction of the vehicle and disposed at left and right sides along the width direction of the vehicle, a side sill front member 72 coupled to the front end portion of the side sill member 70 along the length direction of the vehicle. The lower end of the front pillar 40 may be coupled to the side sill front member 72. A second reinforcing member 80 for reinforcing the front side member 10 and the side sill member 70 may be further included. A first end of the second reinforcing member 80 may be connected to the front side member 10 while a second end may be connected to the side sill front member 70. The second reinforcing member 80 may prevent the wheels of the vehicle and the collision object from being pushed in a backward direction and may induce a wheel deviation from the vehicle body during a front small overlap collision of the vehicle.

Figure 4:
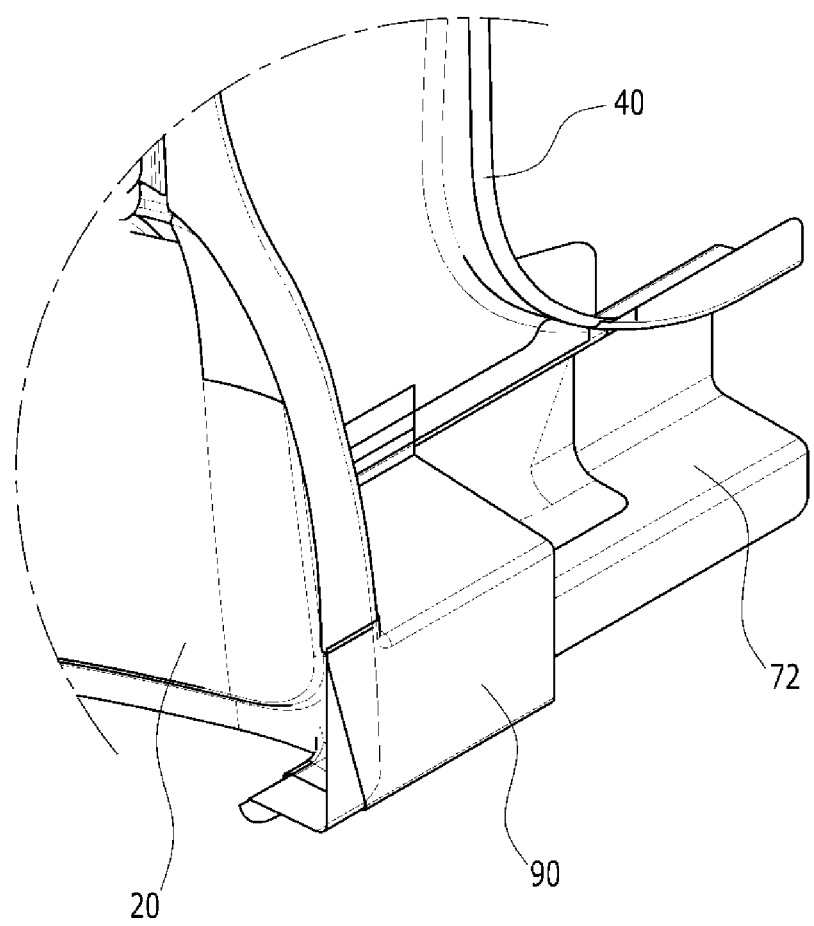
FIG. 4 is an exemplary perspective view of the lower portion of the front vehicle body reinforcing structure according to an exemplary embodiment of the present disclosure.

Referring to FIG. 1 and FIG. 4, a third reinforcing member 90 may be coupled to a front end portion of the side sill front member 72 in the length direction of the vehicle. The side sill front member 72 may be coupled to a lower portion of the front pillar 40 and the third reinforcing member 90 may be coupled to the coupling portion of the side sill front member 72 and the front pillar 40. Additionally, the third reinforcing member 90 may be formed with a box-shaped cross section. The third reinforcing member 90 with the second reinforcing member 80 may prevent the wheels of the vehicle and the collision object from being pushed in a backward direction and may induce a wheel deviation from the vehicle body during a front small overlap collision of the vehicle.

Referring to FIG. 5 and FIG. 6, a fourth reinforcing member 100 may be inserted into and coupled to the side sill front member 72 and the side sill member 70. The fourth reinforcing member 100 may be formed to have a box-shaped cross section as a steel or aluminum extrusion material. The fourth reinforcing member 100 reinforces the rigidity of the side seal member 70 and may suppress excessive collision deformation of the side seal member 70 during a side small overlap collision of the vehicle and a side collision of the vehicle.

Additionally, a slanted surface 102 inclined backward in the length direction of the vehicle may be formed at the front end portion of the fourth reinforcing member 100. The slanted surface 102 of the fourth reinforcing member 100 may be coupled with the second reinforcing member 80 in the front small overlap collision of the vehicle to enable the wheels of the vehicle to move along the slanted surface 102 to be displaced from the vehicle body.

Figure 7:
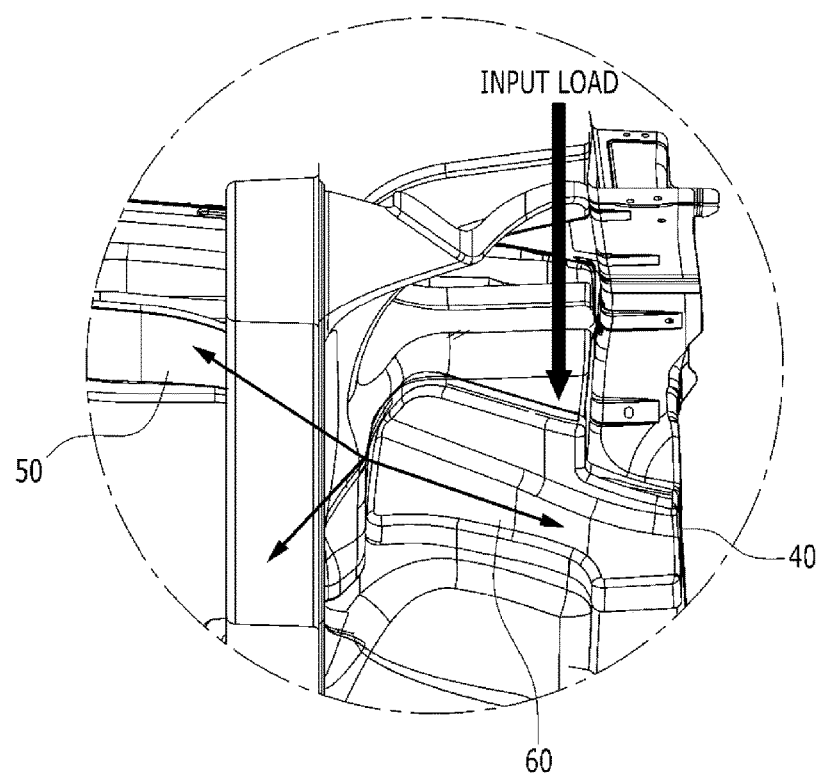
FIG. 7 is another exemplary perspective view of the lower portion of the front vehicle body reinforcing structure according to an exemplary embodiment of the present disclosure.
Figure 8:
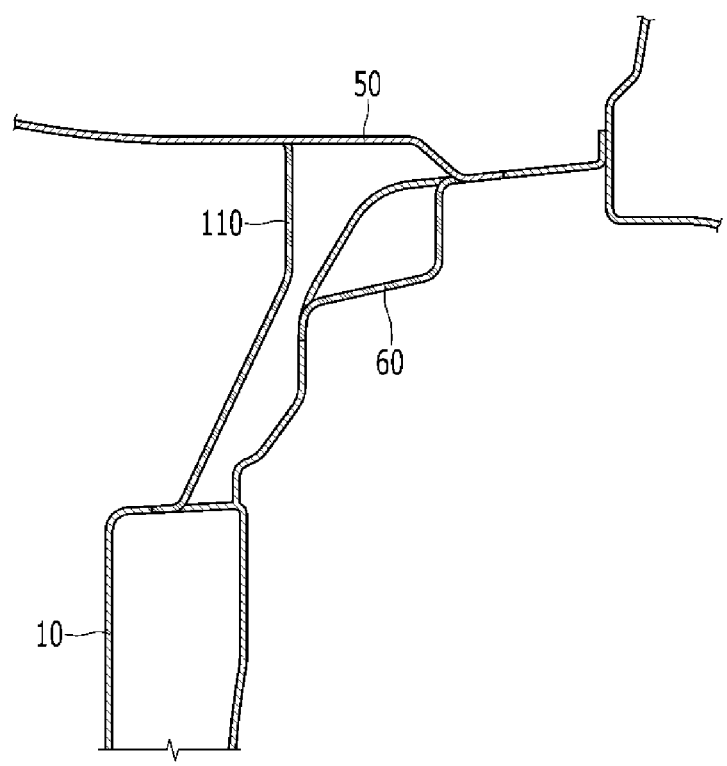
FIG. 8 is an exemplary B-B line cross-sectional view of FIG. 1 according to an exemplary embodiment of the present disclosure.

In accordance with the front vehicle body according to an exemplary embodiment, as shown in FIG. 7 to FIG. 9, a fifth reinforcing member 110 connecting the front side member 10 and the cowl cross member 50 may be further included. The connection rigidity between the front side member 10 and the cowl cross member 50 may be increased by the fifth reinforcing member 110. The fifth reinforcing member 110 may be connected to the first reinforcing member 60 to disperse the collision input load generated during the front small overlap collision of the vehicle to the fifth reinforcing member 110 and the cowl cross member 50 through the first reinforcing member 60. Accordingly, the collision damage of the vehicle body may be reduced and the torsional stiffness of the vehicle body may be improved.

While this disclosure has been described in connection with what is presently considered to be exemplary embodiments, it is to be understood that the disclosure is not limited to the disclosed exemplary embodiments. On the contrary, it is intended to cover various modifications and equivalent arrangements included within the spirit and scope of the appended claims.

DESCRIPTION OF SYMBOLS

10: front side member
20: wheel housing panel
30: dash panel
40: front pillar
50: cowl cross member
60: first reinforcing member
70: side sill member
80: second reinforcing member
90: third reinforcing member
100: fourth reinforcing member
110: fifth reinforcing member

What is claimed is:

1. A front vehicle body reinforcing structure, comprising:
a front side member formed to extend along a length direction of a vehicle and disposed at both left and right sides along a width direction of the vehicle;
a wheel housing panel in which a wheel of the vehicle is housed, disposed on an exterior of the front side member in the width direction of the vehicle and coupled with the front side member;
a dash panel formed to extend in the width direction and a height direction of the vehicle, and dividing an engine compartment and an occupant compartment;
a front pillar formed to extend in the length direction and the height direction of the vehicle and coupled with the wheel housing panel and the dash panel;
a cowl cross member formed to extend in the width direction of the vehicle and including end portions coupled to the front pillar and the wheel housing panel, respectively; and
a first reinforcing member formed to extend in the length direction and the height direction of the vehicle and coupled to the wheel housing panel and the front pillar,
wherein the cowl cross member is coupled to an upper surface of the wheel housing panel in the height direction of the vehicle and the front pillar, and the first reinforcing member is coupled to a lower surface of the wheel housing panel in the height direction of the vehicle and the front pillar to form a closed cross section by the cowl cross member, the first reinforcing member and the front pillar.

2. The front vehicle body reinforcing structure of claim 1, wherein the first reinforcing member is disposed to form an obtuse angle with respect to the front side member.

3. The front vehicle body reinforcing structure of claim 1, further comprising:
   a side sill member disposed at left and right sides based on the width direction of the vehicle; and
   a side sill front member coupled to a front end portion of the side sill member in the length direction of the vehicle,
   wherein a lower end portion of the front pillar is coupled to the side sill front member.

4. The front vehicle body reinforcing structure of claim 3, further comprising:
   a second reinforcing member having a first end portion coupled with the front side member and a second end portion coupled with the side sill front member.

5. The front vehicle body reinforcing structure of claim 3, further comprising:
   a third reinforcing member coupled to the front end portion of the side sill front member in the length direction of the vehicle.

6. The front vehicle body reinforcing structure of claim 5, wherein the side sill front member is coupled to the lower portion of the front pillar, and the third reinforcing member is coupled to the portion where the side sill front member and the front pillar are coupled to each other.

7. The front vehicle body reinforcing structure of claim 5, wherein third reinforcing member has a box-shaped cross section.

8. The front vehicle body reinforcing structure of claim 3, further comprising:
   a fourth reinforcing member inserted into and coupled to the side sill front member and the side sill member.

9. The front vehicle body reinforcing structure of claim 8, wherein the fourth reinforcing member is formed to have a box-shaped cross-section from a steel or aluminum extruded material.

10. The front vehicle body reinforcing structure of claim 8, wherein a front end portion of the fourth reinforcing member in the length direction of the vehicle is formed with a slanted forward surface in the length direction of the vehicle.

11. The front vehicle body reinforcing structure of claim 1, further comprising a fifth reinforcing member that connects the front side member and the cowl cross member.

12. The front vehicle body reinforcing structure of claim 11, wherein the fifth reinforcing member is connected with the first reinforcing member.

* * * * *